METHOD OF IMAGING A DATA STORAGE MEDIUM
Original Filed April 15 1964 4 Sheets-Sheet 1
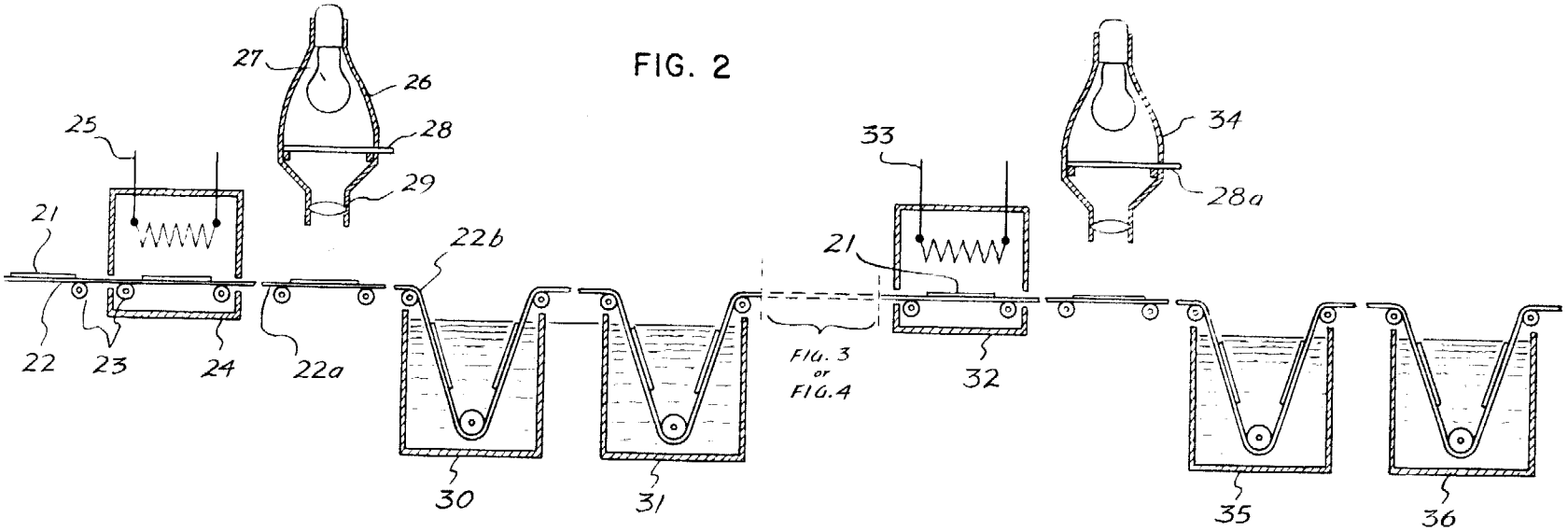
FIG. 2
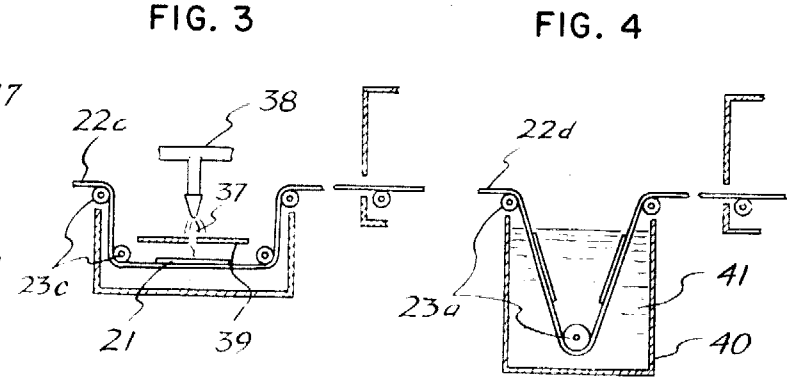
FIG. 3
FIG. 4
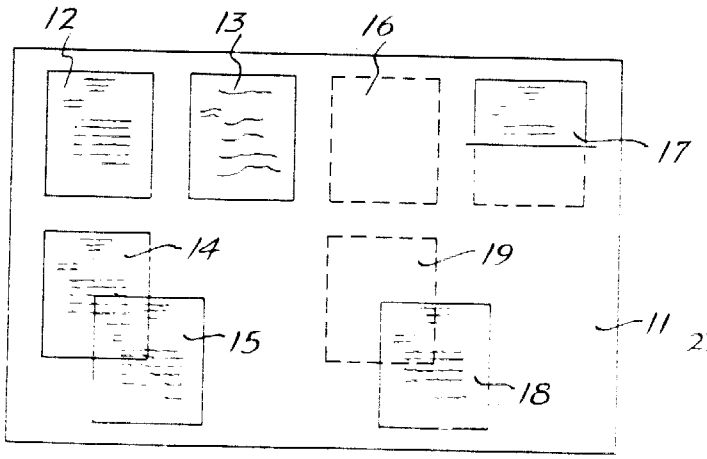
FIG. 1
INVENTORS
ELLIOT BERMAN
CARL F.W. EKMAN
BY
ATTORNEY

METHOD OF IMAGING A DATA STORAGE MEDIUM

Original Filed April 15, 1964

INVENTORS
ELLIOT BERMAN
CARL F. W. EKMAN
BY Stanley Belsky
ATTORNEY

METHOD OF IMAGING A DATA STORAGE MEDIUM

Original Filed April 15, 1964 4 Sheets-Sheet 3

INVENTORS
ELLIOT BERMAN
CARL F.W. EKMAN
BY Stanley Belsky
ATTORNEY

METHOD OF IMAGING A DATA STORAGE MEDIUM

Original Filed April 15, 1964 4 Sheets-Sheet 4

INVENTORS
ELLIOT BERMAN
CARL F.W. EKMAN
BY Stanley Belsky
ATTORNEY

United States Patent Office

Re. 27,012
Reissued Dec. 22, 1970

27,012
METHOD OF IMAGING A DATA STORAGE MEDIUM

Elliot Berman, Quincy, and Carl F. W. Ekman, Bedford, Mass., assignors to Itek Corporation, Lexington, Mass., a corporation of Delaware Original No. 3,390,989, dated July 2, 1968, Ser. No. 360,007, Apr. 15, 1964. Application for reissue Oct. 28, 1968, Ser. No. 786,493
Int. Cl. G03c *5/04, 5/24*
U.S. Cl. 96—27 19 Claims

Matter enclosed in heavy brackets [ ] appears in the original patent but forms no part of this reissue specification; matter printed in italics indicates the additions made by reissue.

ABSTRACT OF THE DISCLOSURE

This invention relates to methods of updating or adding information to a data storage medium comprising a photoconductor as the photosensitive component thereof. The medium may be uniformly deactivated and selectively activated to development by chemically reactive image forming materials. Also, the invention relates to a method of storing data in the form of polychromatic images by repetitive exposure and development of the said data storage medium.

This invention relates to systems, methods and apparatus for data storage. The invention relates in particular to systems employing techniques such as sequential printing, overprinting, color printing, erasing, partial or selective erasing, and the like, for storing and retrieving data, and relates also to such techniques per se and to apparatus for practicing such techniques.

Present systems employing conventional photographic means for the production of images to be stored are subject to a number of disadvantages. Unexposed printing media for silver halide photography, for example, are highly sensitive to radiation prior to exposure and development, and require special handling. Conversely, after development the same media are insensitive and cannot be reused. If the data stored in such a medium requires alteration by the addition or subtraction of information, a fresh medium, subject to the disadvantages of sensitivity, must be exposed and developed, whereupon it then also becomes insensitive to further attempts to modify the information stored therein.

According to the present invention, exceedingly versatile data storage systems are disclosed. For example, the data storage systems of the present invention are adaptable to the use of overprinting and sequential printing techniques without replacement of the printing media employed. The same techniques can be modified to produce color prints. Further, the systems of the invention may involve the erasure of data storage media in toto, or partially or selectively. The erased media can then be reprinted or overprinted, or sequentially printed, all without replacement.

Commonly owned copending Berman et al. application Ser. No. 199,211, filed May 14, 1962, the details of which are incorporated herein by reference, discloses such a photographic imaging or copy media comprising photoconductive materials, i.e. materials having light activatably electrons, adaptable to use in the systems of the present invention. Exposure of such media to an image pattern of activating radiation renders chemically reactive those portions of the photoconductor media which are struck by radiation. The activated irradiated medium is next contacted with a developer system to effect a chemical redox reaction, on such contact, between the developer system and the activated chemically reactive portions of said medium. For example, according to the teachings of the copending application a filled or coated paper comprising a photoconductor such as titanium dioxide is exposed to an image pattern of radiation, and is then developed by simple contact with a developer system forming an image by redox reactions occurring at activated chemically reactive portions of the photoconductor. For example, the exposed medium may be contacted with a solution containing ions of a metal such as copper, silver, mercury, gold. The ions are reduced to free metal on contact with activated chemically reactive portions of the copy medium. Although exposures can be used which are sufficient to cause precipitation of such an amount of metal ion to free metal as will form a visible image in the copy medium, shorter exposure times can also be used. These result in the deposition of amounts of free metal which are insufficient to form visible images. Such "latent developed images" can be subsequently amplified by contact with developer systems of a type known in the silver halide photographic arts, for example, such as those comprising silver ion in admixture with a reagent forming a redox system, such as hydroquinone. Developer systems of this type tend to deposit further free metal on a surface where free metal is already present, and can be used in the present invention to amplify a priorly formed "latent developed image" or can be used alone in a single developing step to form a visible image directly.

A better understanding of the present invention and its many advantages will be had by referring to the accompanying drawings, in which:

FIG. 1 is a front view of one type of data storage unit adaptable to use in the systems of the invention;

FIGS. 2, 3 and 4 schematically show data storage systems adaptable to handling the data storage units of FIG. 1;

Figure 5:
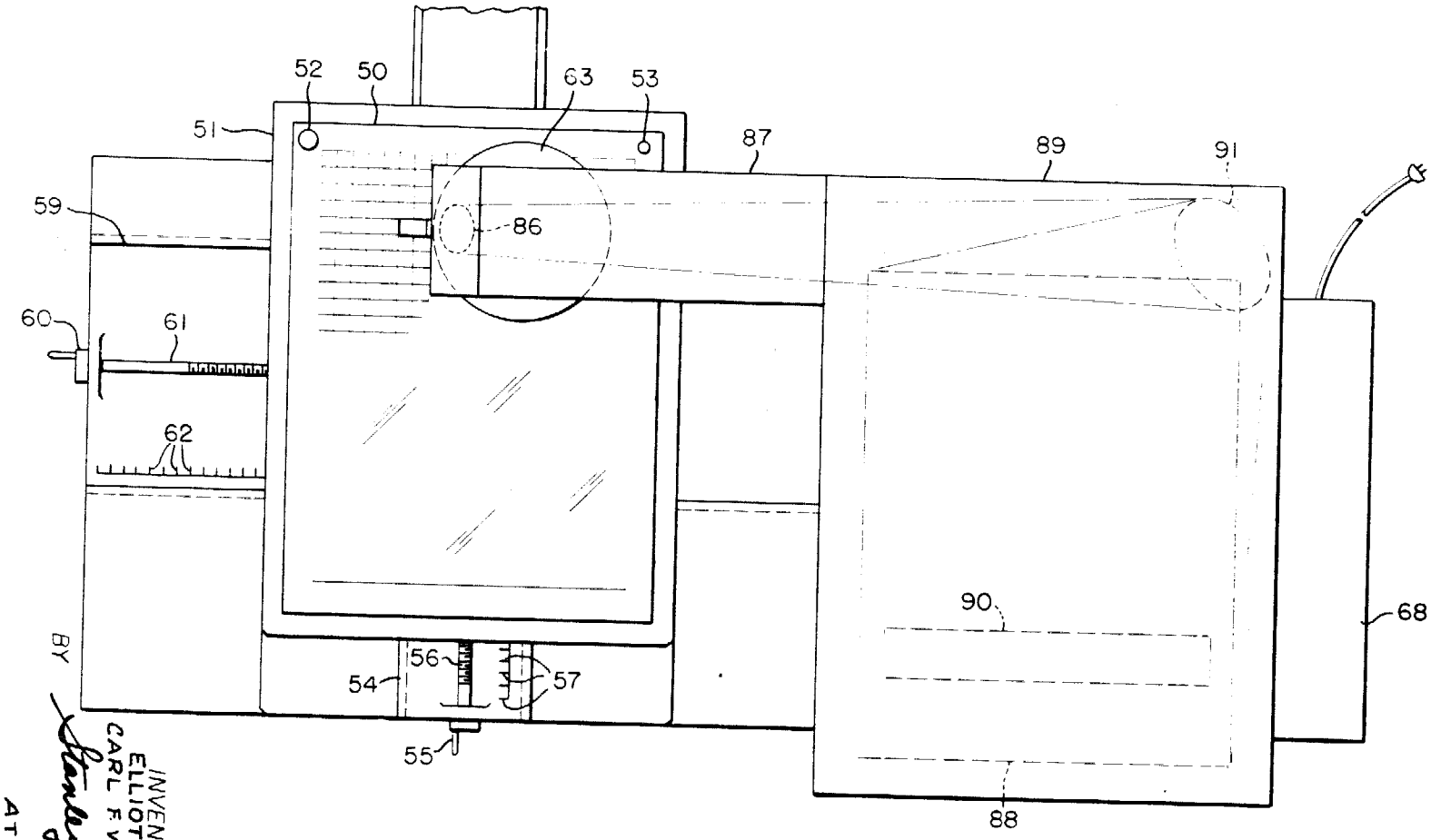
FIG. 5 shows a top plan view of apparatus for adding image bits of information to a data storage unit such as illustrated in FIG. 1.

The inventive data storage system and methods will be described first in relation to schematically illustrated apparatus generally adaptable for practicing the invention, and then an especially advantageous apparatus will be described that is adapted for adding micro images to a micro card in accordance with a variation of the inventive systems.

FIG. 1 shows data storage unit 11 having a plurality of bits of information printed thereon according to the present invention. Unit 11, which may comprise a material such as paper filled or coated with a photoconductive substance such as titanium dioxide, is shown in the form of a file card of a type suitable for use as a billing record for credit customers of a retail store. As the customer charges merchandise, a running record of the charges is kept on the file card by reproduction thereon, suitably in reduced size, of the sales slip or other indicium identifying the amount charged to the customer, the goods purchased, and/or other details of each transaction or of the account.

Unit 11 of FIG. 1, for example, shows entry 12 comprising a transaction record entered on the file card storage unit. Second entry 13 is a record of a separate later transaction which has been entered on unit 11 subsequent to the recording of entry 12 by a process herein referred to as "sequential printing." Entries 14 and 15 of FIG. 1 have been entered on unit 11 in a manner such that the image patterns of the entries overlap, or are "overprinted," as described more fully later herein. The broken lines surrounding area 16 indicate the erasure of a previous entry from unit 11. As suggested by entry 17, such erasure may be only partial according to the present invention. Finally, entry 18 is shown on unit 11 printed over priorly erased area 19, suggested by broken lines.

FIGS. 2–4 of the accompanying drawings schematically show data storage systems suitable for treating and handling data storage units such as unit 11 of FIG. 1. FIG. 2 can be considered as showing, from left to right, a time-sequential involvement of a data storage system according to the invention with a single data storage unit, or as showing such a system involving a plurality of such units in different stages of cooperation with various other different elements of said system. For simplicity, FIG. 2 is conveniently considered as showing a time-sequential operation.

FIG. 2 shows data storage unit 21 removably attached to guide and transport means, shown as belt 22 and rollers 23. For the sake of simplicity in describing the inventive data storage systems, details such as housings, the return of belt 22, and specific attaching means such as clamps or the like have not been shown since they are incidental to such systems. It should be understood that the transport means of FIG. 2 may comprise either a single continuous belt, shown in FIG. 2 as broken for convenience of representation, or may comprise a plurality of separately driven belts, 22, 22–a, 22–b, etc. to afford more flexible control of time sequential operations. Other apparatus for practicing data storage systems according to the invention is described below.

Data storage unit 21 of FIG. 2 comprises a photoconductive material of the type described in copending application Ser. No. 199,211, including materials such as Ge, BN, $TiO_2$, ZnO, $ZrO_2$, $GeO_2$, $In_2O_3$, $K_2Al_6Si_6O_{22}$. $2H_2O$, $SnO_2$, $Bi_2O_3$, PbO, BeO, $Sb_2O_5$, $SiO_2$, $BaTiO_3$, $Ta_2O_5$, $TeO_2$, $B_2O_3$, ZnS, and $SnS_2$, for example. Many of these compounds are photoconductive compounds of metals with non-metals of Group VI–A of the Periodic Table, for example metallic oxides and sulfides. The materials, suitably in the form of finely-divided water-insoluble particles, may be simply deposited on a substrate, as on a glass plate, or dispersed in a self-supporting material such as a plastic foil or the fibrous web of a paper, or dispersed in a suitable binder and coated onto a substrate such as glass, wood, paper, metal, or other rigid or flexible insulating or conducting materials.

Referring again to FIG. 2, unit 21 is suitably first guided by means 22–23 to deactivating means 24, shown in FIG. 2 as including light-shielded electric heating coil 25. Coil 25 is a source of infrared radiation which uniformly deactivates the photoconductive component of unit 21, rendering the unit uniformly receptive to activating radiation. Alternatively, a simple dark storage of unit 21 will tend to deactivate any non-selectively activated portions thereof, but simultaneous use of infrared speeds deactivation. Still other deactivation techniques include playing a corona discharge, as from a Tesla coil, onto the photoconductor medium.

After uniform deactivation in means 24 image-receptive medium is next carried to exposure means 26, where it is exposed to an image pattern of activating radiation. Means 26 of FIG. 2 include source 27 of activating radiation, transparency 28 comprising an information image pattern desired to be stored, and appropriate optical systems 29 for focusing the image, in reduced or magnified form if desired, on unit 21.

After exposure, unit 21 comprises chemically reactive portions where the photosensitive component thereof has been struck by activating radiation. The unit is next passed to developing means 30–31 including a plurality of receptacles for developing and fixing and/or washing media employed in the developing step to produce a visible image in the medium.

For example, receptacle 30 suitably holds a developing system comprising silver ion and hydroquinone-quione. The system forms a visible image of free silver in unit 21 on contact by chemical reaction with those portions of the photoconductor material of unit 21 which have been made chemically reactive to redox reagents by exposure to activating radiation. Suitably, receptacle 31 may then simply comprise water for thorough washing of unit 21 to remove excess developer. Additional stopping, fixing, and washing baths (not shown in FIG. 2) may be employed between the step of contact with the developer and the final washing step.

In still other embodiments of the invention suggested by FIG. 2, the exposed selectively activated unit 21 may be developed by a first contact with a developer system 30 forming an invisible image comprising precipitated free metal in said medium. In a separate step, this "latent developed image" may be made visible by contact with a further developer system 31 to amplify the image already present, as earlier discussed herein. Additional washing and fixing steps may be used, but are not shown in FIG. 2.

On emergence from bath 31, data storage unit 21 of FIG. 2 has one or more bits of information present thereon. The unit is not visibly affected by exposure to ordinary light or other radiation, even if such light or radiation activates the photoconductive material of the unit. The unit can be stored for indefinate periods of time. Yet at any time the unit can be printed on again with or without partial or complete erasure of information alread present, obviating the need for replacement of the data storage unit with a fresh, receptive, unexposed photosensitive medium.

When further information is added to unit 21, the printing steps already described are, in essence, repeated. As shown in FIG. 2 for example, unit 21 is passed to means 32 for uniform deactivation to render the unit receptive to selective activation by exposure to an image pattern of activating radiation. As in deactivating means 24, means 32 may include source 33 of infrared or other deactivating radiation.

After being made image receptive by uniform deactivation, unit 21 is exposed to a further image pattern of activating radiation in exposure means 34 similar to means 26, and is then developed and fixed in a system including developing means 35–36.

The techniques employed in the second printing step just described do not differ significantly from those employed in the first printing step earlier described. Indeed, although desensitizing means 33, exposure means 34, and developing means 35–36 of FIG. 2 are shown as distinct from their counterparts 25, 26, and 30–31 in the same Figure, it should be understood that the various means may be one and the same. That is, in the systems of the invention, the same desnsitizing, exposing, and developing means can be used and re-used in successive printing steps without duplication of these components of the system.

If desired or appropriate, printed data storage unit 21 can be partially or totally erased using erasing means like those of FIG. 3, for example. FIG. 3 shows unit 21 brought by guiding means 22c–23c into contact with chemical erasing system 37 controllably dispensed by dispenser 38. Unit 21 and erasing system 37 are suitably contacted through protective mask 39, which permits selective application of chemicals 37. Controlled erasure of information stored in data storage unit 21, for example partial erasure, is thus possible.

The data storage systems of the invention may be employed in color printing. For example, the system shown in FIG. 2 can be used for color printing by the employment of appropriate screened transparencies 28 and 28a in exposure means 26 and 34, and by the use of appropriate color developers in developing stages 30–31 and 35–36. Color development processes, known in the art and involving dye-forming reactions dependent on oxidation of developers during the formation of precipitated silver or other metals, can be used in the systems of the invention. In these processes, deposited metals are commonly dissolved out of the print after the printing of a given color component to leave only the colored dye image.

FIG. 4 of the drawings shows bleaching means 40 with which metal deposits can be removed from a color print. Means 40 suitably comprise bleaching bath 41 and appropriate guide means 22d–23d for bringing unit 21 into contact therewith.

FIG. 2 shows the erasing or bleaching means of FIGS. 3 and 4 as suitably arranged between a first and second printing step shown in FIG. 2. However, it should be understood that erasing or bleaching of a printed data storage unit may be accomplished after a plurality of sequential prints or, indeed, whenever there is a developed image present to be erased or bleached.

Several important advantages of the systems of the present invention should now be clear. Thus, for example, providing that care is taken to remove excess unreacted developing agent, mere exposure of a printed data storage unit to radiation, after development, will effect no visible change in the unit, whether or not such radiation activates the photosensitive material of the unit. Thus, the printed unit may be handled as any ordinary record.

Nevertheless, such a printed unit remains capable of further printing, without replacement, by subjection to a proper sequence of exposure and development steps as already discussed. Uniform deactivation of the printed unit prior to further imaging exposure and development, for example either by simple storage in the dark or by treatment with deactivating radiation, will assure that any unwanted activation brought about by random exposure of the unit to activating radiation will not interfere with further controlled printing. Not only may a fresh or previously unexposed portion of the data storage unit be exposed and developed to add information to the unit, but already printed portions of the unit may be overprinted if desired. The units may be in part sequentially printed and in part overprinted, simultaneously or in any sequence.

If developer systems tending to amplify pre-existing developed images are employed in development steps subsequent to a first printing, further development of developed images already present may be avoided, if this becomes desirable, by a selective development of only the last exposed portion of the data storage unit, for example by masking other portions of the unit, or by application of discrete portions of the developer.

Erasure of all or of a portion of the data stored in systems according to the present invention can be used if correction or removal of certain printed information is desired. For example, if silver images have been formed by reduction of silver at the activated surface of a data storage unit, the silver can be conveniently removed by chemical bleaching techniques, such as those involving oxidation or complexing. Suitable silver bleaching systems are well known in the photographic arts, for example. Such systems include potassium ferricyanide bleaches, for example, or aqueous solutions of hydrogen peroxide. Analogously, dye images can be erased by techniques destroying the dyestuffs by oxidation or reduction, or simply by washing with a solvent for the dye. For example, certain dyes may be oxidatively destroyed by exposure to high energy light, such as ultraviolet light. Alternatively, suitable deposited materials forming an image in a data storage unit of the invention may be removed by electrochemical means, if such is convenient in the particular system employed.

A given bit of information may be printed in the data storage systems of the invention in a manner different from other bits, as desired, by variations in the processes already described. For example, certain entries made in data storage unit 11 of FIG. 1 may be made by developing latent images formed therein using developers comprising silver ion, while other entries may be developed using solutions comprising gold ion, or mercury ion, for example, or some other metallic or non-metallic material having chemical or physical properties distinguishing it from silver. If materials are used whose visible properties differ from those of other materials used on the same data storage record, visible differentiation of entries is possible, for example. However, discrepancies in properties other than visual properties can also be of advantage.

For example, the use of different writing materials in the records of the invention permits differential erasing of the records. For example, in a system employing different developers respectively precipitating metallic gold and silver, information bits printed in elemental silver can be preferentially erased employing bleaching agents for silver to which bits printed in a material such as gold are impervious. Obviously, other variations involving preferential retention of silver and removal of more fugitive materials can also be employed. For example, organic solvents can be used to remove dye prints while leaving metallic deposits unaffected.

The adaptability of the systems of the present invention to techniques involving overprinting (the printing of a plurality of superimposed images) renders the systems adaptable to color printing. U.S. Pat. No. 2,750,292 granted June 12, 1956 to Dippel et al., for example, teaches methods and materials for the formation of colored images by the amplification of latent images of metals such as mercury, silver, gold, and platinum. Just such latent images or "latent developed images" are formed according to the present invention. Alternatively, the aforementioned patent discloses techniques for the direct production of dye images in situ with latent metal images. Since the data storage systems of the present invention form such latent metal images, these techniques can also be employed in the present invention.

As disclosed in the Dippel et al. patent, and as known elsewhere in the photographic arts relating to color photography, color formation may be primary or secondary. That is, color may be formed directly by the chemical reaction of a developer component during development to form a dye, or by coupling reactions forming color and involving developer oxidation products and additional coulping agents. For example, in a primary color process, a data storage unit according to the present invention is exposed to an image pattern of radiation through a mechanical offset screen exposing only one-third of the area of the unit to be color printed. This exposed portion is then developed to form a red, yellow, or blue image. After development with one color, the silver image formed simultaneously with the dye is removed, for example by treatment of the print with potassium ferricyanide. The print is then re-exposed through the offset screen and developed with another color. Silver is removed as before, the print is exposed for the third and last time, and developed with the last of the three colors employed.

For secondary color formation in the present invention, a coupling component is incorporated into a data storage unit, for example. The unit is thrice exposed through an offset screen, with successive intervening treatment with different developer systems each respectively tending to form a dye of a different component color with the coupling agent. Alternatively, each developer may contain all of the reagents, including the coupler, necessary for formation of dye of a component color.

A better understanding of the present invention will be had by referring to the following specific example, given by way of illustration. The example, which relates to a data storage system in which information is stored in the form of polychromatic prints illustrates not only color formation per se, but the use of the system for reprinting on a data storage medium in a series of printing steps, the feature of overprintability which is requisite to polychromatic image reproduction, and the feature of erasibility—here the selective removal of silver ion to leave dye images.

*Example*

A copy medium was prepared by combining four parts by weight of finely divided $TiO_2$ with one part by weight of an emulsion comprising about 50 percent by weight of "Rhoplex" acrylic resin solids in water. This was used to coat paper sheets.

A sheet of the paper having a coating comprising the $TiO_2$ photoconductor dispersed in the resinous binder was exposed to an image pattern of activating radiation through the focal plane shutter of a "Graflex" camera box using a 100 watt "Hanovia" mercury lamp as the source.

The exposed medium was then contacted for 10 seconds with a solution of 4 g. of silver nitrate in a liter of water. This causes an invisible deposit of metallic silver to form in light-struck areas of the medium where the photoconductor therein has been made chemically reactive by exposure to activating radiation.

Next, the sheet was contacted for 30 seconds with a developer comprising:

| | | |
|---|---|---|
| $H_2O$ | ml | 1500 |
| $Na_2CO_3$ | g | 15 |
| N,N-diethyl-p-phenylenediamine hydrochloride | g | 0.4 |
| Hydroxylamine hydrochloride | g | 1.0 |
| KCNS | g | 0.4 |
| 2,5-dichloroacetoacetanilide dissilved in | g | 0.4 |
| $CH_3OH$ | ml | 25 |

In this solution, the $Na_2CO_3$ suitably adjusts the pH of the developer into the alkaline region. The hydroxylamine hydrochloride is optionally present as an anti-oxidant. The KCNS helps reduce fogging by reversibly forming complexes with $Ag^+$ ion present on the medium from the first bath, thus slowing fogging reactions. The N,N-diethyl-p-phenylene-diamine hydrochloride is an active developing agent, reacting with $Ag^+$ ion, still present on the print from the first bath, to deposit additional silver on the print where free silver is already present.

The oxidation product of the developer, which product is formed only in light struck areas where development takes place, couples with the 2,5-dichloroacetoacetanilide to form a yellow dye in the light-struck areas.

The print was now immersed for two minutes in a stop bath comprising 200 ml. of water, 20 g. of $NaH_2PO_4$, and 2 g. of $Na_2SO_3$. The bath reacts with and removes any excess oxidized developer.

The metallic silver present in the print was next bleached by contact of the print for two minutes with a solution of 200 ml. water, 12 g. of $K_3Fe(CN)_6$, and 3 g. of KBr. Free silver is oxidized and solubilized as silver bromide by the bath.

The print was then fixed for 10 minutes in a solution of 20 g. of $(NH_4)_2S_2O_3$ in 200 ml. of water. Next, the print was thoroughly washed. A yellow negative print of the image pattern of activating radiation was obtained.

The yellow print was subsequently uniformly deactivated by a short heating in the dark to a temperature of about 100° C. with hot air from a dryer-blower apparatus. The deactivated medium was then exposed to activating radiation through an image pattern different from the image pattern earlier employed.

After contact with a solution fo silver ion, the exposed print was developed, stopped, bleached, fixed, and washed as before except that the developer contained 1-phenyl-3-methyl-5-pyrazolone, rather than 2,5 - dichloroacetoacetanilide. The pyrazolone coupled with oxidized developer in the exposed and developed areas to form a magenta dye. Where areas of the second image pattern overlapped the first image pattern, both yellow and magenta dyes were present.

Subsequent to both of these prior exposures, or in lieu of either or both, the print may be desensitized, exposed, and developed with a developer forming a cyan dye in the print. Such a developer, for example, comprises 2,4-dichloronaphthol as a coupling agent.

In an alternative procedure for the formation of multicolor prints, free metal is not bleached from the print until after the multiple exposure and developing steps have all been completed. This process requires that the image from each exposure but the last be developed to maximum density so that the earlier developed image area does not set as an active site for further reduction of silver ion when contacted with a subsequent developing agent.

As a further alternative, the coupling agents useful in a color process of the type described are incorporated into the data storage medium itself, rather than being present in the developing solutions. They may be present in a single coating layer of the medium, for example, or in multiple layers as in conventional silver halide color systems.

Complete or partial erasure of the colored images formed by these processes in a data storage unit can be effected with an organic solvent for the dyes.

It is clear, further, that if the coupling agents are omitted from each of the developer systems described in this example, the example is illustrative of the formation of a silver image in a data storage medium, its erasure, and the printing of another silver image in the same medium in erased and/or priorly unexposed portions thereof.

FIGS. 5–9 show novel apparatus for adding image bits of information to a data storage medium according to the invention. By practical and convenient modifications, the apparatus of FIGS. 5–9 can be adapted to perform all the above mentioned variations of the inventive systems such as latent or developed image erasure, overprinting, color printing, etc. Although not limited to such function, the apparatus of FIGS. 5–9 is especially suited for producing microimages on a microcard medium of the form illustrated in FIG. 1 and having a photoconductor as its photosensitive component as described above. In accordance with the above described methods, the apparatus of FIGS. 5–9 can add bits of information in the form of microimages to a photoconductive microcard on which microimages were previously formed, and between the times of forming of such microimages, the microcard can be treated as an ordinary record medium unharmed and not visibly changed by exposure to light.

The schematically illustrated apparatus of FIGS. 2–4 shows movement of a photoconductive medium through sequences of processing stations for adding image or information bits according to the invention. Economies in time and materials can be accomplished by processing or working upon only the preselected area of the photoconductive medium upon which an additional image bit is desired. For such purpose processing stations can be brought sequentially into registry with the preselected portion of the photoconductive medium that is to receive an image, or for the type of apparatus in which the image receiving medium is moved sequentially through a plurality of stations, only the preselected portion of the medium need be registered with each station. Also, combinations of transporting the image receiving medium and moving processing stations into registry with preselected portions of the medium are possible.

The apparatus of FIGS. 5–9 is especially suited to adding microimages to a microcard image receiving medium by simple and economic means. The machine includes means for accurately placing the added image on the microcard and means for indexing a sequence of processing stations into registry with the preselected portion of the microcard upon which the new image is to be placed.

Figures 6, 9:
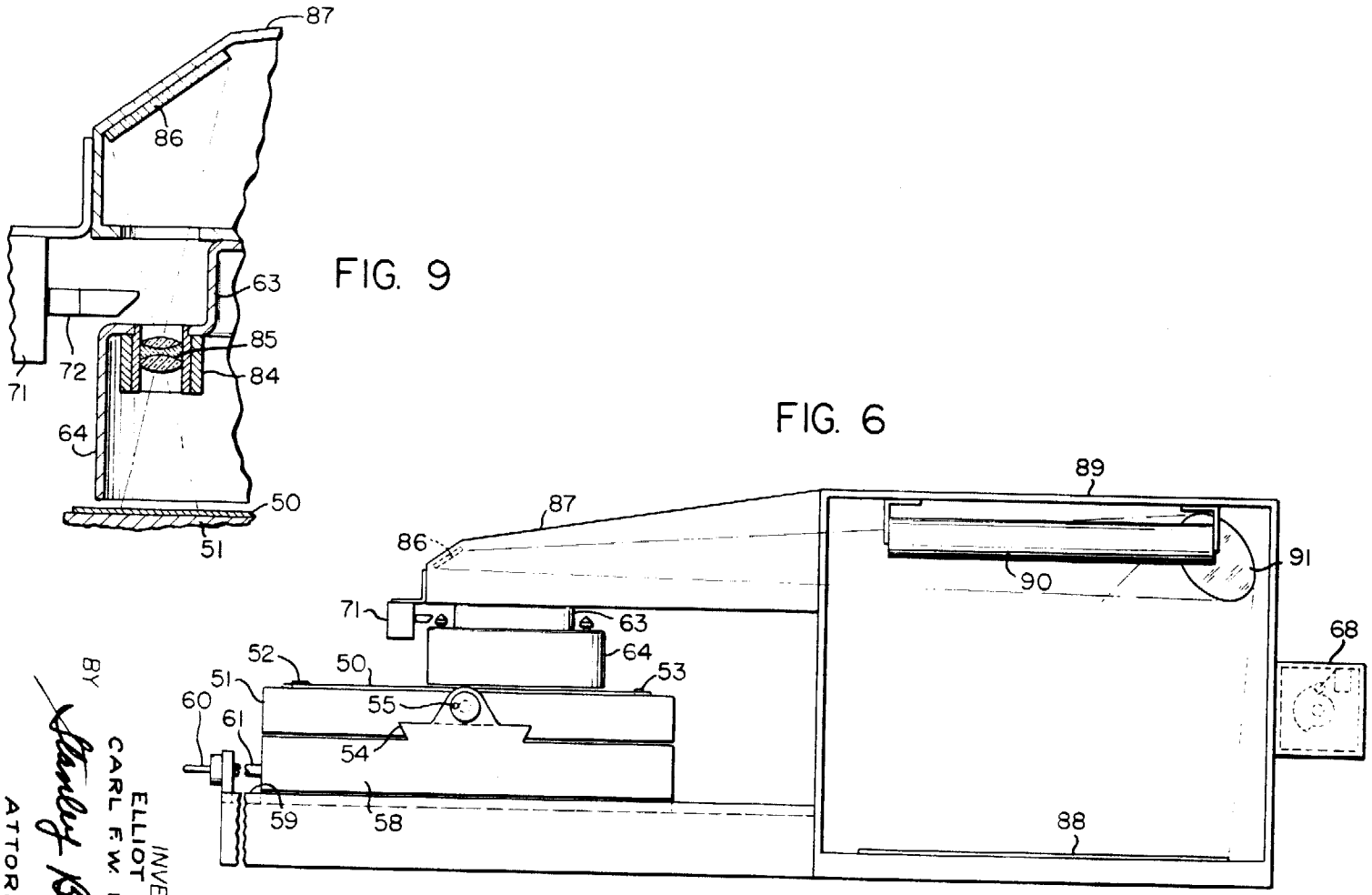
FIG. 6 shows a partially sectioned side view of the apparatus of FIG. 5.
FIG. 9 shows a cross section side view of one station of the turret of the apparatus of FIG. 5.

As best shown in FIGS. 5 and 6, a photoconductive microcard 50 adapted for receiving discrete microimages in the way described above relative to the image receiving medium of FIG. 1, is positioned on a holder 51 and accurately held in place by having two different sized apertures located over different sized pins 52 and 53.

Holder 51 is movable transversely of the machine by sliding on bearing surface or gib 54. The transverse movement of holder 51 is controlled by hand crank 55 and feed screw 56, a predetermined transverse position being selectable by means of index 57 on gib 54.

Microcard holder 51 is positioned longitudinally of the machine by carrier 58 which is slidable longitudinally on a gib 59 and is positioned by hand crank 60 and feed screw 61 according to index 62 on gib 59. By transverse positioning of microcard holder 51 according to index 57 and by longitudinal positioning of carrier 58 according to index 62, any desired portion of microcard 50 can be accurately registered with the operating position of the movable processing stations of the microcopier.

The microcopier of FIGS. 5–9 has a rotatable turret 63 containing a plurality of processing stations for adding an image to microcard 50. The turret 63 is rotated step-by-step for sequentially registering each of its processing stations with the preselected portion of microcard 50 to which a microimage is to be added. Since each of the processing stations of turret 53 is actuated only when in a predetermined rotational position, microcard 50 can be positioned according to indexes 57 and 62 so that an accurately preselected portion of microcard 50 is registered with the predetermined operating position of each of the processing stations of turret 63.

As seen in FIG. 6, turret 63 has a downwardly extending skirt portion 64 under which microcard 50 is closely positioned. The space between the bottom of skirt 64 and microcard 50 is preferably kept to a minimum for excluding ambient activating radiation from microcard 50 during processing. The bottom of skirt 64 can be covered with a light excluding material such as velvet, but in practice, it is possible to exclude sufficient radiation from the portion of microcard 50 that is positioned under turret 63 for processing without making the skirt 64 touch the surface of microcard 50.

The number and form of processing stations in turret 63 can be widely varied for performing many different operations according to the above described systems. For purposes of illustration, the turret 63 (as best shown in FIG. 8) is provided with six operating stations, although it will be understood that the invention can be accomplished with other and different processing stations.

Figure 7:
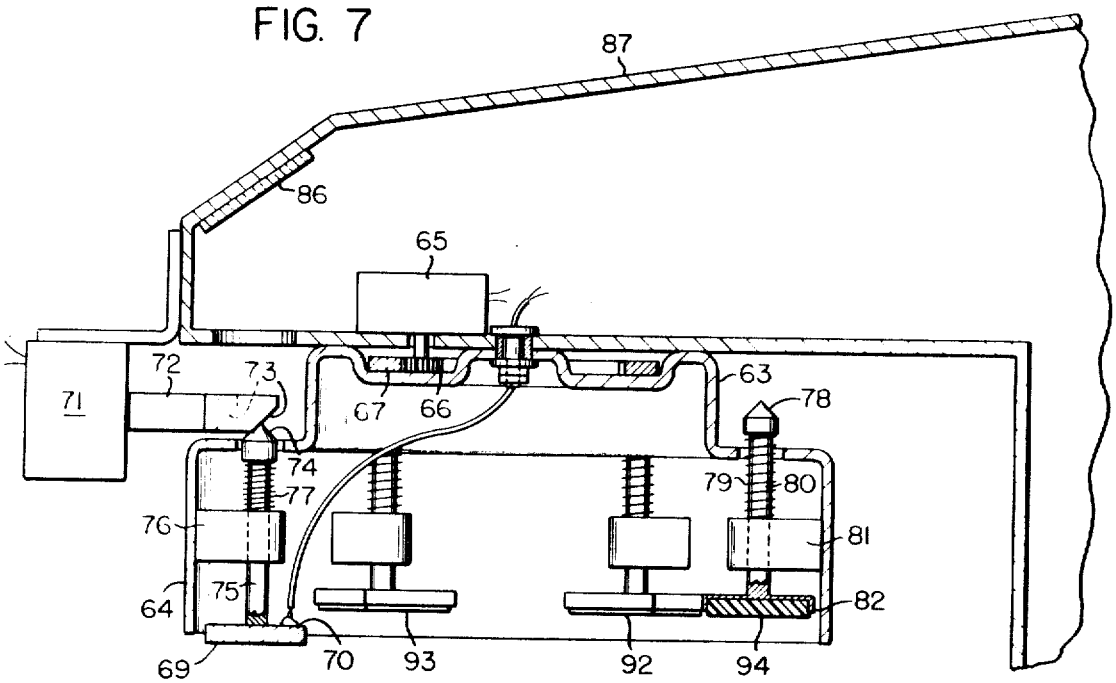
FIG. 7 shows a partially sectioned side view of the processing turret of the apparatus of FIG. 5.
Figure 8:
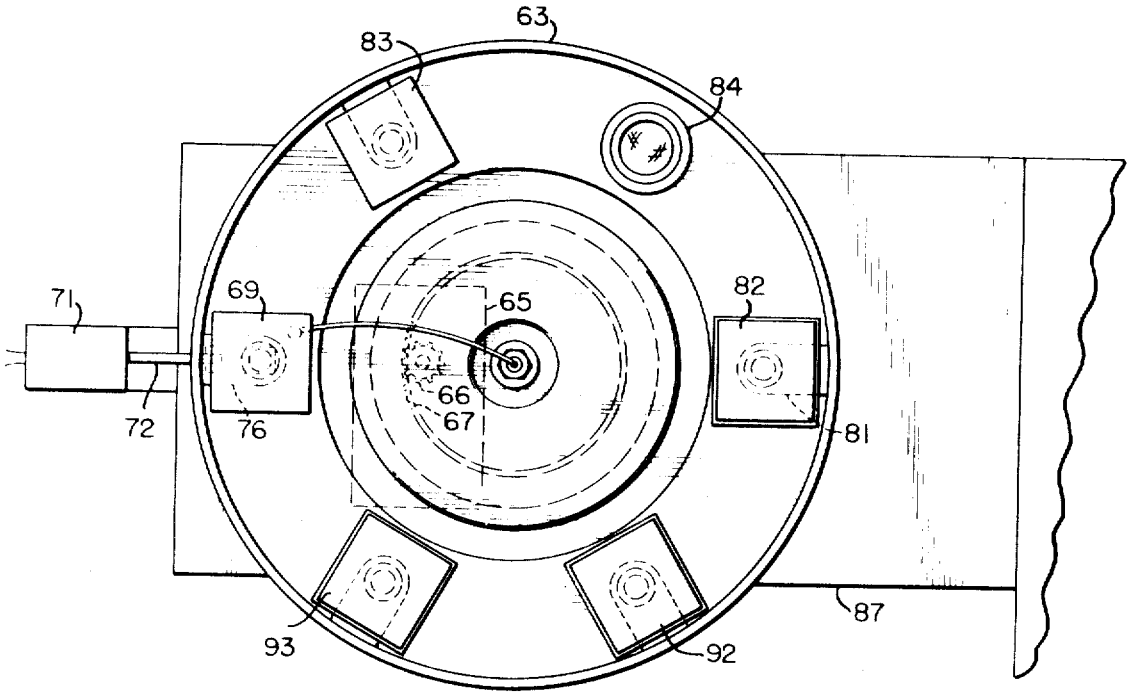
FIG. 8 shows a bottom plan view of the processing turret of the apparatus of FIG. 5.

Turret 63 is driven in step-by-step rotation by an electric motor 65 driving pinion 66 engaging ring gear 67 as shown in FIGS. 7 and 8. Motor 65 is intermittently actuated for indexing turret 63 to bring each sequential processing station to the predetermined operating position by means of timing device 68 shown schematically in FIGS. 5 and 6. Timing device 68 can be constructed in many well known ways for intermittently energizing not only motor 65, but other elements of the microcopier.

As shown in FIGS. 7 and 8, turret 63 is positioned for operation of the first of its sequence of processing stations. This first processing station 69 comprises photoconductor deactivating means and as illustrated is a source of heat comprising an electric heater 70 that is forced downward into contact with microcard 50 (not shown).

As explained above, generally, heating of the photoconductor of an image receiving medium such as microcard 50 deactivates the photoconductor thus effectively erasing any activation, "fogging," or latent image pattern in such photoconductor from previous exposure to activating radiation so that the photoconductor is unifrmly activatable by radiatin and is thus image receptive. Heating or other deactivation of the photoconductor is thus ordinarily the first processing station of the microcopier, since the invention contemplates handling microcard 50 as an ordinary record storage medium exposed to radiation between the additions of microimages.

The electric circuit for heater 70 is preferably opened and closed by timing device 68 so that heater 70 is warm when lowered into contact with microcard 50 and is allowed to cool during actuation of the other processing stations. Deactivating station 69 could also use infrared radiation or a corona discharge. However, the illustrated heater 70 that is lowered into contact with microcard 50 has the advantage of simplicity, speed, economy, effectiveness of operation, and coordination with other operating stations in turret 63.

The raising and lowering of heater element 70 (and of the processing elements at other stations in turret 63) is accomplished by a solenoid 71 that is actuated by timing device 68 in timed relation to movement of turret 63. Solenoid 71 has a movable actuating arm 72 that upon energization of solenoid 71 is forced radially toward the axis of turret 63. Cam surface 73 on the end of solenoid arm 72 engages the conical end of stud 74 fixed to shaft 75 on the other end of which heater element 70 is fixed. Shaft 75 is movable vertically in support 76 and is urged upward by spring 77. Solenoid cam surface 73 cams shaft 75 downward against the bias of spring 77, and as solenoid arm 72 retracts upon de-energization of solenoid 71, spring 77 forces shaft 75 and heater element 70 upward out of contact with microcard 50.

The operation of solenoid 71 and solenoid arm 72 relative to other stations in turret 63 is the same as that described for heater station 69. Thus, as shown in FIG. 7, stud 78, spring 79, and shaft 80 mounted in support 81 for station 82 on the opposite side of turret 63 from heater station 69 react in the same way to energization of solenoid 71 and advancement of solenoid arm 72 when station 82 is positioned adjacent solenoid 71 in the preselected operating position of turret 63. Of course, for operating stations that do not require lowering of a member into contact with microcard 50, solenoid 71 is not energized by timing circuit 68.

After heating of the photoconductor of microcard 50 so as to make the preselected portion of microcard 50 uniformly activated by radiation, the preselected portion of microcard 50 must be cooled before exposure to the desired image pattern of activating radiation. Such cooling can be accomplished by delay before exposure to activating radiation, by a stream of air, by contact with a heat conducting plate, or by other means. As illustrated in FIG. 8, a cooling station 83 is provided in turret 63 and preferably comprises a heat conducting plate similar in construction to the heater of station 69 except for the heating coil. The heat conducting plate of station 83 is lowered into contact with microcard 50 in the same way that heater 70 of heating station 69 is brought into contact with microcard 50. By contact with the plate of station 83, the preselected heated portion of microcard 50 is cooled and readied for exposure to activating radiation.

Turret 63 is then rotated to bring station 84 to the preselected operating position adjacent solenoid 71. A cross section view of station 84 in its operating position is shown in FIG. 9. Station 84 comprises a lens 85 registered with a mirror 86 in hollow, supporting arm 87 and arranged so that light from a document 88 to be microimaged on microcard 50 is focused on the preselected portion of the microcard 50.

As shown in FIGS. 5 and 6, document 88 is positioned in light chamber 89 and illuminated by a radiation source 90. Radiation source 90 may provide visible or prefreably ultraviolet light and is energized by timer 68 at the appropriate time and for a desired interval for exposing microcard 50. Light reflected from document 88 is directed onto microcard 50 by a system of mirrors or prisms in well-known ways. As schematically illustrated, mirror 91 reflects light from document 88 onto mirror 86, and as shown in FIG. 9, mirror 86 directs light to lens 85 which forms a microimage of document 88 on microcard 50.

Exposure of microcard 50 to activating radiation in the microimage of document 88 produces a latent image in the photoconductor of microcard 50 by activating portions of the photoconductor. Such a latent image can be developed and made visible in several ways as described above. Remaining stations 82, 92, and 93 of turret 63 are arranged for developing such latent image. Stations 82, 92, and 93 are shown as illustrative only, it being evident from the above description of the inventive systems that the number and type of developing stations can be varied within the spirit of the invention.

Development of the latent image in the photoconductor is preferably accomplished by application of liquids to the exposed portion of microcard 50. Unlike silver halide films, microcard 50 has no gelatin layers which must be penetrated by liquid developers, so that development of the latent image in the photoconductor of microcard 50 can be accomplished by several very simple devices that contact the surface of microcard 50 with thin coatings of developing agents. Such developer applying devices include porous rollers or pads that are wetted from containers of liquid developing agents, sponge or fibrous rollers or pads soaked with developing agents, sprays, cups, slotted containers, meniscus rollers, and dipping or soaking.

A simple and preferred type of developer applying means illustrated in FIGS. 7 and 8 comprises a porous pad 94 that is wetted with developing fluid. Means not shown, such as containers and metering devices can be employed in well known ways for keeping pad 94 at the desired degree of wetness. These means may be placed in the turret adjacent the pads.

After pad 94 is forced downward into contact with microcard 50 in the manner described aobve relative to heater 70, turret 63 is preferably advanced a small amount by motor 65 in response to timing device 68 for sliding pad 94 a short distance. Pad 94 preferably covers the entire exposed portion of microcard 50, but such skidding movement of pad 94 applies a more even layer of developing agent to the exposed portion of microcard 50.

The cam surface 73 of solenoid arm 72 is wide enough to allow a short rotational movement of conical stud 78 relative to cam surface 73 during driving of turret 63 a small rotational amount for accomplishing such wiping of pad 94 across the surface of microcard 50.

After the wiping of pad 94 on microcard 50, solenoid arm 72 is retracted and pad 94 is raised upward from the surface of microcard 50 by spring 79. Turret 63 is then advanced to bring station 92 over the exposed portion of the microcard 50, and a second developing fluid is applied in the same way as the application of station 82 was made. The same step can be repeated for station 93. Thus, the latent image in the photoconductor of the preselected exposed portion of the microcard 50 can receive a developing fluid application and a fix, or two developing applications and a fixing application, or a series of developing, fixing, and washing treatments, or other developing treatments according to the materials used and results desired.

It will thus be seen that the microcopier provides a convenient, practical, economical, and advantageous apparatus for adding microimage bits of information to a microcard according to the invention. Many substitutions of parts and elements are possible in the microcopier, and the systems of the invention can be practiced by other than the illustrated apparatus. Thus it is to be understood that the above disclosure is intended in an illustrative, rather than a limiting sense, as it is contemplated that various modifications in process steps and construction and arrangement of parts will readily occur to those skilled in the art, within the spirit of the invention and the scope of the appended claims.

We claim:

1. A method for updating a data storage medium, said medium comprising a photoconductor itself sufficient as the photosensitive component of said medium, which method comprises first exposing said medium imagewise which activates said medium in the exposed portions of said medium, then uniformly deactivating this thus exposed medium then re-exposing said uniformly deactivated medium imagewise which renders said photoconductor chemically reactive in portions of said medium corresponding to the imagewise re-exposure and applying to the data storage medium after one or more of the exposure steps a chemically reactive image forming material.

2. A method as in claim [1] *18* wherein said re-exposed medium is developed to form a permanent image corresponding to said image pattern by contact of at least said reactive portions thereof with a redox system chemically reacting on such contact with said chemically reactive portions of said medium to form said visible image.

3. A method as in claim 2 wherein said permanent image formed in said medium comprises a colored dye.

4. A method as in claim [1] *18* wherein the imagewise re-exposure at least in part activates portions of said medium wherein information is already stored.

5. A method as in claim [1] *18* wherein the photoconductor is a compound formed between a metal and a non-metallic element of Group VI–A of the Periodic Table.

6. A process as in claim [1] *18* wherein the photoconductor is at least one member selected from the group consisting of a metal oxide and a metal sulfide.

7. A process as in claim [1] *18* wherein the photoconductor is a finely-divided titanium dioxide dispersed in (a) a fibrous web of paper, or (b) a suitable binder coated on a support.

8. A method for adding information to a data storage medium having information already stored therein, said medium comprising a photoconductor itself sufficient as the photosensitive component of said medium, which method comprises erasing at least a portion of said stored information from said medium, uniformly deactivating said medium, then exposing said uniformly deactivated medium to an image pattern of activating radiation, thereby rendering said photoconductor chemically reactive in portions of said medium corresponding to said image pattern of radiation.

9. A method as in claim 8 wherein said exposed medium is developed to form a visible image corresponding to said image pattern by contact of at least said reactive portions of said medium with a redox system chemically reacting on such contact with said chemically reactive portions of said medium to form said visible image.

10. A method as in claim 9 wherein said visible image formed in said medium comprises a colored dye.

11. A method as in claim 8 wherein said image pattern of activating radiation at least in part activates portions of said medium where already stored information has been erased.

12. A method as in claim 8 wherein the photoconductor is a compound formed between a metal and a non-metallic element of Group VI–A of the Periodic Table.

13. A process as in claim 8 wherein the photoconductor is at least one member selected from the group consisting of a metal oxide and a metal sulfide.

14. A process as in claim 8 wherein the photoconductor is a finely-divided titanium dioxide dispersed in (a) a fibrous web of paper, or (b) a suitable binder coated on a support.

15. The method of storing data in the form of polychromatic images in a data storage medium, which method comprises exposing a data storage medium comprising a photoconductor itself sufficient as the photosensitive component of said medium to a first image pattern of activating radiation, thereby rendering said photoconductor chemically reactive in portions thereof corresponding to said first image pattern of radiation, developing said exposed medium by contact of at least said reactive portions thereof with a redox system chemically reacting on such contact with said chemically reactive portions of said medium to form a first image comprising a first colored dye, re-exposing said developed medium at least partially in the previously exposed or developed portions of said medium to a second image pattern of activating radiation, to render said photoconductor chemically reactive in portions thereof corresponding to said image pattern of radiation, and then developing said exposed medium by contact of at least said reactive portions thereof with a redox system chemically reacting on such contact with said chemically reactive portions of said medium to form a second image comprising a second colored dye.

16. The method as in claim 15 wherein a metal deposit is formed in image areas of said medium on development of said first image, and wherein, prior to exposing said medium to said second image pattern, said metal deposit is selectively removed from said medium without removing said first colored dye.

17. A process as in claim 15 wherein the photoconductor is a finely-divided titanium dioxide dispersed in (a) a fibrous web of paper, or (b) a suitable binder coated on a support.

*18. A method for updating a data storage medium, said medium comprising a photoconductor itself sufficient as the photosensitive component of said medium, which method comprises first exposing said medium imagewise which activates said medium in the exposed portions of said medium, contacting said medium with chemically reactive image-forming materials to form a permanent image, then deactivating at least portions of this medium, then re-exposing said deactivated medium imagewise which renders said photoconductor chemically reactive in portions of said medium corresponding to the imagewise re-exposure and applying to the data storage medium a chemically reactive image-forming material.*

*19. A method for updating a data storage medium, said medium comprising a photoconductor itself sufficient as the photosensitive component of said medium, which method comprises first exposing a first portion of said medium imagewise which activates said medium in the exposed portions of said medium, contacting said medium with chemically reactive image-forming materials to form a visible image, then deactivating at least a portion of this medium, then re-exposing a second portion of said deactivated medium imagewise which renders said photoconductor chemically reactive in portions of said medium corresponding to the imagewise re-exposure.*

References Cited

The following references, cited by the Examiner, are of record in the patented file of this patent or the original patent.

UNITED STATES PATENTS

| | | | |
|---|---|---|---|
| 2,051,603 | 8/1936 | Hruska | 96—43X |
| 2,750,292 | 6/1956 | Dippel et al. | 96—48X |
| 2,990,280 | 6/1961 | Giaimo | 96—1 |
| 3,152,903 | 10/1964 | Shepard et al. | 96—64 |
| 3,279,095 | 10/1966 | Carlson | 96—43X |
| 3,284,224 | 11/1966 | Lehmann | 96—1X |
| 3,331,276 | 7/1967 | Oliver | 88—24 |
| 3,372,029 | 3/1968 | Nail | 96—1.8X |
| 3,380,823 | 4/1968 | Gold | 96—27 |
| 3,404,980 | 10/1968 | Gilman et al. | 96—27 |

OTHER REFERENCES

Cassiers, Memory Effects in Electrophotography, Journal of Photo. Science, vol. 10, No. 2, pp. 57–64 (March-April 1962).

GEORGE F. LESMES, Primary Examiner

C. E. VAN HORN, Assistant Examiner

U.S. Cl. X.R.

96—1, 48; 355—27